UNITED STATES PATENT OFFICE.

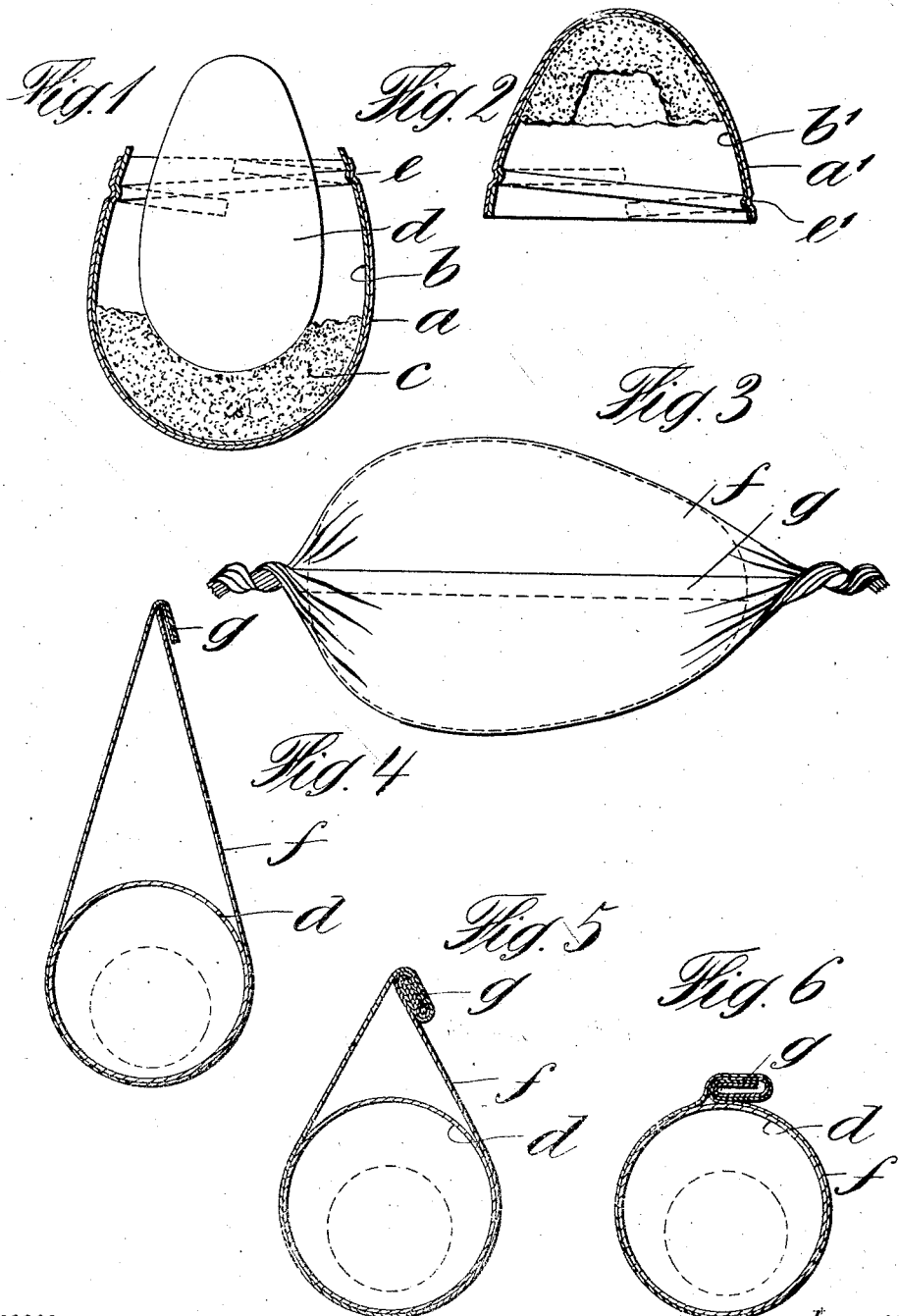

WALTHER KULENKAMPFF, OF MAGDEBURG, GERMANY.

METHOD OF PRESERVING AND PACKING EGGS.

1,063,043.     Specification of Letters Patent.     Patented May 27, 1913.

Application filed November 4, 1911. Serial No. 658,588.

*To all whom it may concern:*

Be it known that I, WALTHER KULENKAMPFF, subject of the German Emperor, residing at Magdeburg, Germany, have invented a certain new and useful Method of Preserving and Packing Eggs, of which the following is a specification.

The hitherto known, numerous methods for keeping eggs fresh suffer from the defects that the bacteria already present in the eggs were either not removed at all or were only unsatisfactorily removed prior to the inclosing of the eggs in an impermeable envelop, or that even when the bacteria were removed for the moment, opportunity was afforded for fresh bacteria to enter the eggs again during the subsequent storage and transport thereof. It was also not advantageous as regards the good taste of the eggs and the boiling thereof, to permanently impregnate them partly internally and partly externally with foreign substances, which, moreover, caused the shells of the eggs to burst, when the latter were boiled.

The new method forming the subject of the present invention avoids these disadvantages by first removing the bacteria from the interior and exterior of the eggs, which are to be kept fresh and storing the eggs subsequently or simultaneously in a packing which is free from and proof against bacteria without any alteration being perceptible either in the external appearance of the eggs or in their taste.

Described in detail the new method consists in disinfecting the eggs, (which may be previously cleaned,) both internally and externally by evacuating them in any well known manner and then treating them with a disinfecting agent, (formaldehyde being the most convenient), afterward filling them again with sterilized air or some suitable gas and finally packing and sorting them under the influence of the evaporation of a moist disinfecting agent in a strong special envelop rendered proof against the entrance of bacteria by imparting a suitable shape to it.

As is well known, the soft contents of the raw egg do not completely fill up the interior of the shell, but leave a space therein which is filled with air. The egg shell is porous, and the result thereof is, that the air in the interior of the egg shell, even if it does not already contain bacteria, is able to take them up from the external air or from the shell. It must therefore be regarded as a wrong proceeding to simply provide the eggs just as they are with an air tight covering, as has been so frequently done hitherto. It is true, that the covering prevents the entrance of fresh bacteria-laden air, but the bacteria previously present in the egg are alone sufficient to permit the process of putrefaction to begin and it has therefore not been possible to obtain eggs effectively preserved from putrefaction in this way. Other experimenters then recognized that the air contained in the interior of the egg and the bacteria contained in the interior thereof was the cause of the putrefaction. The eggs were therefore evacuated and attempts made to surround them with an impenetrable covering. This treatment did not, however, yield the desired result. Finally mention may be made of an attempt to fill up the air space in the eggs with a disinfecting agent. This proceeding did not yield the expected result either, because the disinfecting agent, when able to gradually evaporate through the egg shell, finally became useless. The artificial sealing up of the egg shell is willingly avoided, because it causes the shells to burst in hot water.

The new method of preserving eggs yields on the other hand a product which is entirely deprived of all possibility of putrefying. For this purpose the eggs are first washed in the usual way with soda or the like and then evacuated. A disinfecting gas, preferably formaldehyde, is now introduced under pressure into the hollow space in the egg shell. After this gas has exerted its action sufficiently, it may be allowed to remain, or be drawn off, and sterilized air or some other sterilized inert gas pumped in in its place. The egg is consequently filled and no longer has any tendency to absorb air from its surroundings. After this the egg is dipped into a disinfecting liquid and taken out again without being dried. The pores of the egg shell remain open. After the egg has been removed from the disinfecting liquid with or without precautions to keep it in a sterilized condition, it is now packed in an envelop which protects it from the approach of bacteria.

It is not absolutely necessary to surround the egg itself with a covering which is impermeable to air, but the egg must be sealed against the entrance of bacteria.

In the drawings Figures 1 and 2 show, by way of example and in transverse section, a two-part bacteria-proof protective envelop for eggs. Fig. 3 shows a different constructional example for a bacteria-proof envelop. Figs. 4 to 6 show more exactly the way in which the different stages of the sealing up of the protective envelop shown in Fig. 3 are carried out.

The entrance or penetration of bacteria through or between the parts of closely folded sheets or plies is materially obstructed by the close association of the parts in forming the fold joint, and therefore a repeatedly creased and folded paper bag seal is obstructive proof against the free entrance of bacteria, without requiring to be made air-tight at all. For this reason an egg-shaped envelop in two parts, with a screw-joint, may serve admirably as a bacteria-proof envelop, (see Figs. 1 and 2). It is not necessary to make a stiff envelop of this kind from a material impervious to bacilli, any desired cheap material may be selected for this capsule $a$ and it need only be lined internally with some material $b$ such as paper, cloth or other sheet material treated in any preferred manner to adapt it to perform the desired function and which is incapable of taking up and is impermeable to bacilli. On account of the differences in the size of the eggs the capsule $a$ will be lined with a sterilized elastic filling substance $c$, which may be used in the well known way to obtain a certain reserve supply of a moist disinfecting agent. Where it is not filled up by the egg itself, the hollow space inside the protective envelop will therefore be saturated with vapors of the moist disinfecting agent. The disinfecting agent will not, however, pass through the open pores of the egg, because the egg itself and its own hollow space is filled up by its soft mass and the filling gas previously pumped into it, which gas may be sterilized air for example. This last mentioned circumstance is important for those who are opposed to the bringing of edible substances into contact with chemical products, even when these products are ever so innocuous.

In the constructional example of a protective envelop for eggs shown in Figs. 3 to 6, the envelop is formed by laying the egg in the center of an open sterilized sheet of paper, the longitudinal edges of which are laid together, as shown in Fig. 4 and folded over. The creasing of the longitudinal edges may be repeated several times, as is shown in Figs. 5 and 6, until the creased paper strip lies as close as possible to the egg. For the sake of clearness the various creases of the edge of the paper have been intentionally shown as being separated from each other, but in reality the several layers of paper will lie close against each other. Figs. 4 to 6 of the drawings show the egg as seen in end view and with both ends of the envelop open, the latter having at this stage a tubular form. The two ends of the tubular envelop are then closed up by twisting them up after the manner of the wrapping papers used for oranges, as is shown in Fig. 3. These tightly twisted up ends of the paper and also the fold fastening are materially proof against the entrance of bacteria on account of their manifold creases and turns. Sterilized wood wool may also be used as a bacteria-proof envelop. The simplicity of the packing of the eggs in the protective envelop is of importance, because unskilled labor may be employed for this work.

What I claim is:—

1. The process for preserving eggs, which consists in first disinfecting the clean eggs internally and externally by evacuating and then filling them with a gaseous disinfectant, then replacing the latter with an innocuous gas and finally packing them in a bacteria proof wrapper, substantially as described.

2. The process for preserving eggs, which consists in first disinfecting the clean eggs internally and externally by evacuating and subsequently filling them with a gaseous disinfectant, then replacing the latter with an innocuous gas, then dipping them in a liquid disinfectant, and finally packing them in a bacteria-proof wrapper, substantially as described.

3. The process for preserving eggs, which consists in first treating the eggs with a disinfecting process and then packing them in bacteria-proof wrappers lined on the inside with a sterilized absorbent material impregnated with disinfectant substance, substantially as described.

4. The process for preserving eggs, which consists in subjecting the clean eggs to a disinfecting process and then packing them in bacteria-proof wrappers prepared from sterilized loose fibrous material, substantially as described.

In testimony whereof I have hereunto set my hand in the presence of two subscribing witnesses.

WALTHER KULENKAMPFF.

Witnesses:
  Fedor Glepues,
  Christian Feillach.